Aug. 4, 1953  J. D. LEE  2,647,268
ROCKING SUPPORT
Filed Aug. 20, 1951
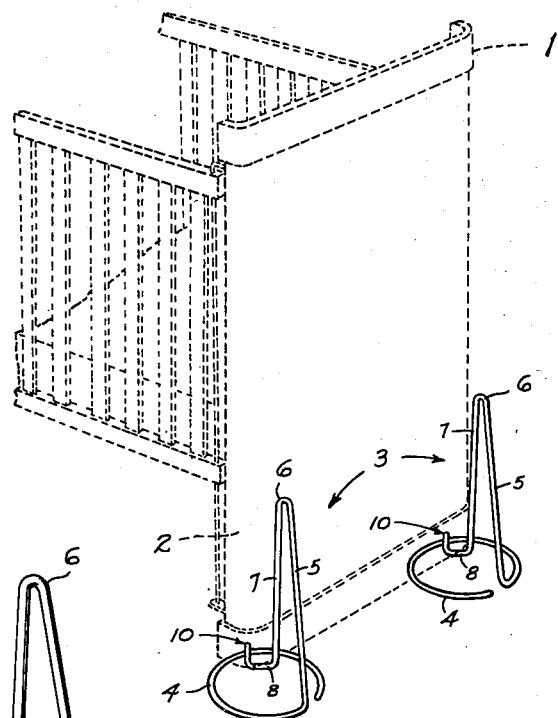
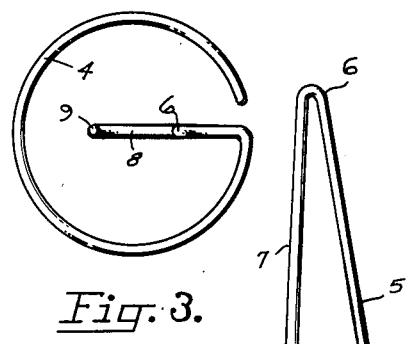
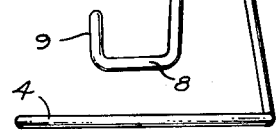
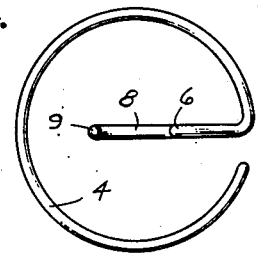
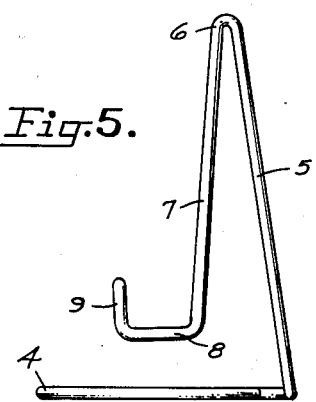
INVENTOR.
Jason D. Lee Patented Aug. 4, 1953

2,647,268

UNITED STATES PATENT OFFICE 2,647,268

ROCKING SUPPORT

Jason D. Lee, Salem, Oreg.

Application August 20, 1951, Serial No. 242,720

5 Claims. (Cl. 5—104)

This invention relates to improvements in rocking support attachments for use with furniture such as a bed or crib, and particularly to a device capable of affording lateral freedom to the foot of the bed so that it may be manually or mechanically oscillated to comfort an infant reclining therein.

An object of my invention is to provide an attachment for a conventional baby bed or crib whereby an inexpensive bent spring steel wire may be substituted for the conventional casters for instance at the foot of the bed so that lateral rocking motion may be obtained by causing the head of the bed to pivot on the conventional casters while a lateral swaying motion is manually or mechanically induced in the bed to lull the infant reclining therein.

One caster substitute for use with a baby bed which has already been invented consists of a perpendicular coiled spring with caster stem which may be substituted for each conventional caster, but that device affords only a vertical bouncing action, whereas by invention delivers a lateral swaying motion which is more conducive to somnolence. Also, the relatively elaborate coil spring construction of this similar device requires a greater construction cost which is reflected in the ultimate purchase price. I have become dissatisfied with this mechanism and other available rocking devices for baby beds and accordingly have directed my inventive efforts toward the provision of a more simple less expensive device which may be substituted for the two casters at the foot of the bed using the conventional caster wells as the sole means of attachment and which can be sold within a price range available to most young parents.

Another object of this invention is to provide a caster substitute for a conventional baby bed or crib which will afford lateral freedom so that it may be used in conjunction with a mechanical baby rocking device consisting of a gyrating eccentric mass which is hooked on the end or side of the bed.

Ancillary objects and features of importance will become apparent in following the description of the illustrated form of the invention.

In the drawings:

Figure 1 is a view of the foot of a conventional baby bed or crib with the caster substitute rocking supports mounted in the conventional caster wells;

Figure 2 is a view looking down upon the caster substitute rocking support having a counter-clockwise base as used at the left hand side of the bed shown in Figure 1;

Figure 3 is a side view of the caster substitute rocking support having a counter-clockwise base as shown at the left hand side of the bed in Figure 1;

Figure 4 is a view looking down upon the caster substitute rocking support having a clockwise base as shown at the right hand side of the bed in Figure 1;

Figure 5 is a side view of the caster substitute rocking support having a clockwise base as shown at the right hand side of the bed in Figure 1.

Referring to the drawings 1 is a conventional baby's crib having an end supporting panel or member 2 adapted to be engaged at its bottom by resilient floor contacting supports 3.

Each support 3 may conveniently be formed from an integral piece of resilient material such as spring steel. Base 4 of the support is annular or ring shaped and has projecting obliquely upwardly therefrom a leg 5 which is bent over at 6 into a depending leg or intermediate portion 7 extending towards base 4. The free end of leg 7 above base 4 is U-shaped and has a laterally extending portion 8 substantially parallel to base 4 and an upstanding prong 9 substantially perpendicular to the base and positioned between the center of the base and its periphery.

Prong 9 engages member 2 at 10 as shown in Fig. 1 in the same manner as the customary casters do which support 3 is designed to replace. Supports 3 are preferably substituted for casters only at one end of the crib and are made to support the crib at a height from the floor the same as that of the conventional casters at the other end. The combination of casters at one end and resilient supports at the other end of the crib permit a reciprocal rocking action when force is applied to the crib by either manual or mechanical means.

In carrying out the invention the conventional casters at the foot of the bed are removed and the stem of the caster substitute rocking support with a counter-clockwise base is inserted in the caster well at the left hand side of the foot of the bed in the position shown in Fig. 1 and the stem of the caster substitute rocking support with a clockwise base is inserted in the caster well at the right hand side of the foot of the bed in the position shown in Fig. 1, after which manual or mechanical rhythmic lateral force is applied to the side or foot of the bed causing it to pivot back and forth on the conventional casters (not shown) at the head of the bed and swing the foot of the bed in a small arc as limited by the spring action of the caster substitute rocking supports thereby producing an oscillatory movement to comfort and lull the infant occupant of the bed.

I claim:

1. A spring support for an article of furniture comprising an annular base, a leg projecting upwardly therefrom, an intermediate portion of the leg bent over and depending towards but spaced from the base and terminating in an upwardly projecting prong extending away from said upwardly projecting leg.

2. A spring support for an article of furniture comprising an annular base, a first leg projecting obliquely upwardly from the base, a second leg depending from the upper end of the first leg towards but spaced from the base, and a prong extending up from the end of the second leg in the direction of the first leg but extending away from the latter, thereby being arranged for engagement with the article of furniture.

3. A resilient support for a baby's crib comprising an annular base, a leg projecting obliquely upwardly therefrom, an intermediate portion of the leg bent over and depending towards but spaced from the base, and an end portion of said leg being U-shaped, a portion of said end extending laterally away from the upwardly projecting leg and substantially parallel to the base and the other portion of the end projecting upwardly into a prong.

4. A resilient floor support for a baby's crib comprising an annular base adapted to contact the floor, a leg projecting obliquely upwardly therefrom, a second leg depending from the upper end of the first leg towards the base, the free end of said second leg being bent upwardly away from the upwardly projecting leg and above the base to form an upstanding prong positioned between the center and periphery of the base.

5. In combination with a baby's crib having supporting members at opposite ends of the crib, a pair of resilient floor contacting supports attached to one of said supporting members at one end of the crib, each of said supports comprising an annular base, a leg projecting obliquely upwardly therefrom, a second leg depending from the upper end of the first leg towards but spaced from the base and terminating in an upwardly projecting prong engaging the supporting member, whereby said one end of the crib may be moved in a reciprocal lateral direction to impart a rocking motion thereto.

JASON D. LEE.

References Cited in the file of this patent

UNITED STATES PATENTS

| Number | Name | Date |
| --- | --- | --- |
| 334,087 | Price | Jan. 12, 1886 |
| 572,717 | Rankin | Dec. 8, 1896 |
| 1,069,196 | Smith | Aug. 5, 1913 |

FOREIGN PATENTS

| Number | Country | Date |
| --- | --- | --- |
| 310,482 | Italy | Aug. 19, 1933 |